July 13, 1943.           C. W. BERRY            2,324,353
                    ROLLER TIP FOR FISHING ROD
                       Filed Feb. 16, 1942
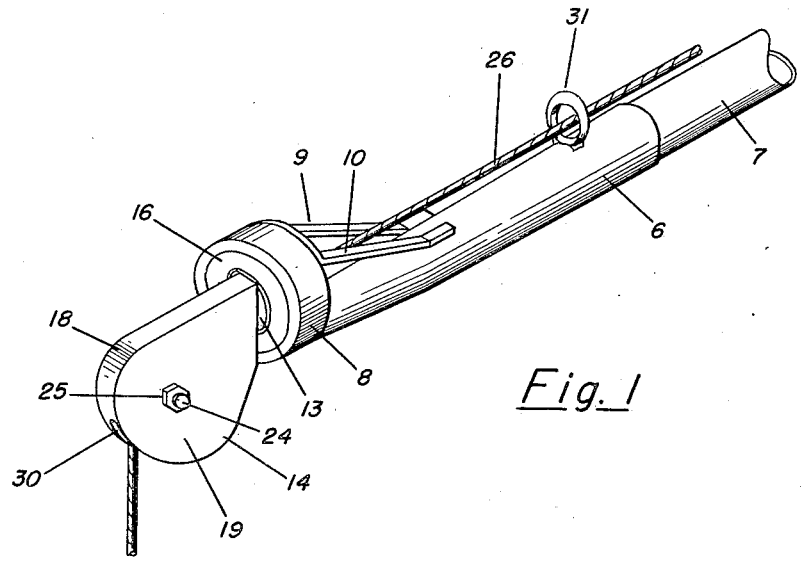
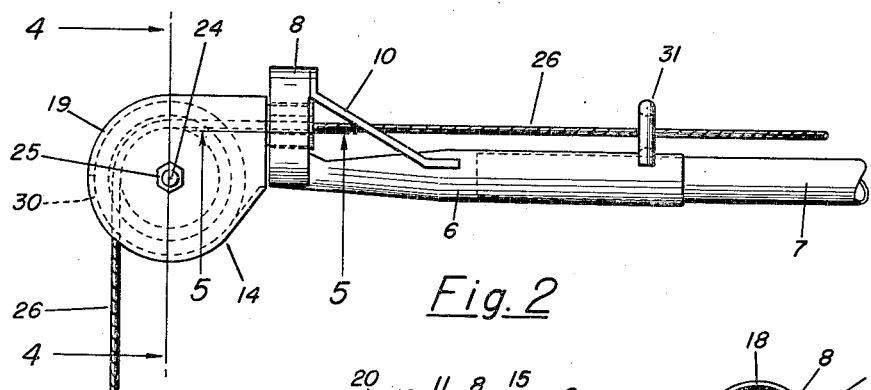
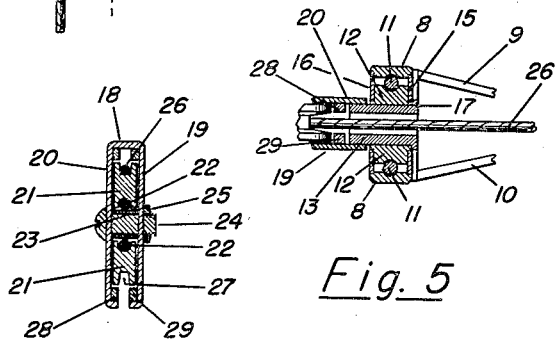
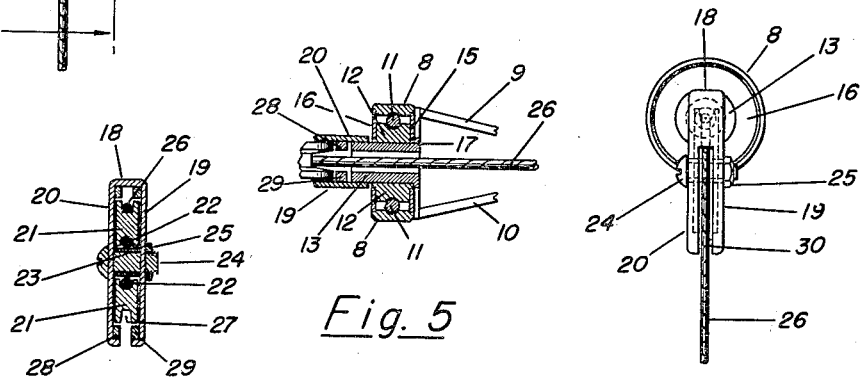
INVENTOR
Calvin W. Berry
BY Everett N. Curtis
ATTORNEY Patented July 13, 1943

2,324,353

UNITED STATES PATENT OFFICE 2,324,353

ROLLER TIP FOR FISHING RODS

Calvin W. Berry, San Diego, Calif.

Application February 16, 1942, Serial No. 431,023

5 Claims. (Cl. 43—24)

My invention relates to roller tips for fishing rods, and its objects are to prevent entanglements, and to insure against undue wearing or tearing, of the fishing line; to bring about the easy running out and the unimpeded reeling in through housed passageways of said line at all times and under all conditions encountered by the fisherman; to facilitate casting and the better handling of fish when a strike has been accomplished; to provide an automatic and self adjusting means for clearing the line from the pole when in actual use, without special effort being required to be given thereto; to enable the ready assembly, disassociation, repair and replacement of parts, and to simplify and render more effective the operation of the several parts. Other objects will appear as illustrated in the drawing and as hereinafter more particularly described and claimed.

At the present time in the common fishing rod employed by fishermen, the usual tip at the outer end thereof terminates in a ring through which runs the fishing line either out or in. Such ring is immovably affixed to the end of the rod, and constant care is required to prevent the line from encircling the rod and from becoming entangled with said ring as with other loops mounted upon said rod and and provided for the running of said line. I have discovered, however, that by forming a housed pivoted connection between said tip and rod so that the line may be threaded therethrough and so that said tip will become fully rotatable and will accordingly follow the movement of that part of the line extending outwardly from said rod, the possibility of such entanglement is guarded against. Particularly is such the case when the said tip is provided with a housed roller on ball bearings for the free passage of the line and a housed ball bearing is mounted upon the end of the rod for turning pivotal connections with said tip as hereinafter described, which construction I have found practically obviates all danger of entanglement.

Attention is hereby directed to the drawing illustrating a preferred form of my invention, in which similar numerals of designation refer to similar parts throughout the several views, and in which—

Fig. 1 is a view in perspective of my improved device, showing the rotatable tip and adjacent parts;

Fig. 2 is a side elevation of the device shown in Fig. 1;

Fig. 3 is an end view of the device shown in Fig. 2;

Fig. 4 is a vertical section on line 4—4 of Fig. 2, looking in the direction of the arrows, and Fig. 5 is a horizontal section on line 5—5 of Fig. 2 looking in the direction of the arrows.

Referring to the drawing, upon the ferrule 6, affixed to the end of the fishing pole 7, I secure the cylindrical casing 8, which is preferably brazed to said ferrule or made integral therewith; reinforcing strips or braces 9 and 10, the ends of which are preferably brazed to said ferrule and casing, being provided to hold the said casing firmly in the position shown. Inside said casing 8 are installed the ball bearings 11, within which revolves the collar 12 affixed to the tubular sleeve 13, brazed or otherwise secured to the jaw 14. Preferably the ends of the casing 8 are closed by the disks or face plates 15 and 16 lodged in seats provided therefor in said casing. Also to prevent longitudinal dislodgment of the sleeve 13, I preferably supply the same at the inner end thereof with the annular ridge 17.

Preferably I construct the jaw 14 of a casing 18, formed in two halves 19 and 20, within which revolves the pulley wheel 21 running upon the ball bearings 22 in contact with sleeve 23; a bolt 24 extending through said sleeve 23 and adjacent openings in the casing halves 19 and 20, serving, when connected with nut 25, to hold these elements together. Over this pulley wheel 21 freely runs the fish line 26, a groove 27 being provided therefor in the periphery thereof. If desired, rings 28 and 29 may be inserted to fill the space within the casing adjacent to the edges of the pulley wheel 21, and serving to keep the said line 26 well within the groove 27 or in close proximity thereto. As will be observed, the outer end of the jaw 14, is provided with the elongated opening 30, extending approximately over the entire lower half thereof and affording ample space for the passage of the line 26 in either of the directions pursued by the same coming from or going toward the reel (not shown).

In using my improved device, the fish line is threaded through the usual loops or rings 31 affixed upon the fishing rod and leading to and from the reel at the base thereof, and through the tubular sleeve 13 into the casing 18 and thence into the groove 27 and over the pulley wheel 21, emerging through the elongated opening 30 formed in the bottom of said casing 18. Upon the usual or desired amount of fish line being extended from the reel, the device is ready for use. As is obvious, when a cast is made the jaw 14 will turn and follow and adjust itself to the movement of the line, removing any possibility of entanglement with the rod or any part thereof. Likewise, after the cast is made the jaw 14 will follow the pull of this line. When a strike is made, the movement of the jaw 14 will also synchronize with the movement of the line upon reeling out or in and at all times prevent entanglement thereof. By reason of this free passage of the fish line at all times, not only will its entanglement be obviated, but also much of the usual wear and tear of the line heretofore experienced will be done away with.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the foregoing description, and all changes which come within the meaning and range of equivalency of the claims are therefore intended to be embraced therein.

What I claim and desire to secure by Letters Patent is:

1. In an apparatus for fishing, the combination of a fishing rod, a housing having an opening therethrough and being secured to the end of said rod, ball bearings mounted within the opening of said housing, a fish line roller casing aligned with said opening, and a hollow shaft forming a fish line passageway and being connected with said casing and journalled within said bearings and operating to revolve therein.

2. In an apparatus for fishing, the combination of a fishing rod, a ferrule mounted upon the end thereof, a cylindrical housing having a fish line passageway therethrough and being connected with said ferrule, a casing pivotally connected with said housing, and a fish line roller aligned with said passageway and mounted within said casing.

3. In an apparatus for fishing, the combination of a fishing rod, a ferrule mounted upon the end thereof, a housing having a fish line passageway therethrough and being connected with said ferrule, a casing mounted upon ball bearings within said housing, and a fish line roller aligned with said passageway and mounted upon ball bearings within said casing.

4. In an apparatus for fishing, the combination of a fishing rod, a housing secured to the end of said rod, ball bearings mounted within said housing, a hollow shaft having a fish line passageway therethrough and journalled within said bearings, a casing connected with said shaft and turning therewith, and a fish line roller aligned with said passageway and mounted upon ball bearings within said casing, the said alignment permitting the fish line to move freely at all times without dislodgment through said housing and casing to and from the reel of said rod.

5. In an apparatus for fishing, the combination of a fishing rod, a housing secured to the end of said rod, ball bearings mounted within said housing, a hollow shaft having a fish line passageway therethrough and journalled within said bearings, a casing connected with said shaft and turning therewith, said casing having an opening located at the bottom thereof for the passage of the fish line therethrough but being otherwise completely enclosed, and a fish line roller having its groove aligned with said passageway and mounted upon ball bearings within said casing, the said fishline being free at all times to move longitudinally without dislodgment through said housing and casing to and from the reel of said rod.

CALVIN W. BERRY.